(12) United States Patent
Stefanoski et al.

(10) Patent No.: US 12,739,445 B2
(45) Date of Patent: Sep. 15, 2026

(54) VIDEO BROADCASTING SYSTEM WITH CHANGEOVER DEVICE FOR SWITCHING BETWEEN MULTIPLE AUGMENTED PRODUCTION IMAGE SEQUENCES OF A CAPTURED REAL EVENT

(71) Applicant: uniqFEED AG, Opfikon-Glattbrugg (CH)

(72) Inventors: Nikolce Stefanoski, Opfikon-Glattbrugg (CH); Nikolaos Athanasiou, Opfikon-Glattbrugg (CH); Ralf Dragon, Opfikon-Glattbrugg (CH)

(73) Assignee: uniqFEED AG, Opfikon-Glattbrugg (CH)

(*) Notice: Subject to any disclaimer, the term of this patent is extended or adjusted under 35 U.S.C. 154(b) by 20 days.

(21) Appl. No.: 18/729,749

(22) PCT Filed: Jan. 3, 2023

(86) PCT No.: PCT/EP2023/050058
§ 371 (c)(1),
(2) Date: Jul. 17, 2024

(87) PCT Pub. No.: WO2023/138912
PCT Pub. Date: Jul. 27, 2023

(65) Prior Publication Data

US 2025/0088678 A1 Mar. 13, 2025

(30) Foreign Application Priority Data

Jan. 18, 2022 (DE) ........................ 102022101086.4

(51) Int. Cl.
*H04N 21/218* (2011.01)

(52) U.S. Cl.
CPC ............................ *H04N 21/21805* (2013.01)

(58) Field of Classification Search
CPC ............................................... H04N 21/21805
See application file for complete search history.

(56) References Cited

U.S. PATENT DOCUMENTS

2002/0120929 A1 8/2002 Schwalb et al.
2006/0026628 A1 2/2006 Wan et al.
(Continued)

FOREIGN PATENT DOCUMENTS

DE 102016119637 A1 4/2018
DE 102016119640 A1 4/2018
(Continued)

OTHER PUBLICATIONS

Unknown, Author, "Adaptive bitrate streaming", Wikipedia; Accessed Jul. 21, 2022, 1-10.

*Primary Examiner* — Sunghyoun Park
(74) *Attorney, Agent, or Firm* — Murphy, Bilak & Homiller, PLLC

(57) ABSTRACT

Described is a video broadcasting system including: a server-side video distribution device configured to receive multiple production image sequences of a captured real event and augmented with virtual content from a production image device and to process same; and at least one user-side video output device which is/can be connected to a video distribution device and configured to receive at least one of the multiple production image sequences and to output one of the received production image sequences or the received production image sequence. The video broadcasting system also has a changeover device configured such that, during the output of the one production image sequence, it automatically switches to another of the received production image sequences and outputs the other production image sequence.

11 Claims, 3 Drawing Sheets

(56) References Cited

U.S. PATENT DOCUMENTS

| | | | | |
|---|---|---|---|---|
| 2016/0286244 | A1* | 9/2016 | Chang | H04N 21/4788 |
| 2018/0295389 | A1* | 10/2018 | Kakurai | H04N 21/8146 |
| 2019/0371363 | A1* | 12/2019 | Dragon | G11B 27/10 |

FOREIGN PATENT DOCUMENTS

| | | | |
|---|---|---|---|
| EP | 3534318 | A1 | 9/2019 |
| EP | 3591981 | A2 | 1/2020 |
| JP | 2019536388 | A | 12/2019 |
| JP | 2020526992 | A | 8/2020 |
| WO | 9926415 | A1 | 5/1999 |
| WO | 2018087275 | A1 | 5/2018 |
| WO | 2021074932 | A2 | 4/2021 |

* cited by examiner

10
C1
C2
A1
A2
S1
S2
18
20
12
14
16
S3a
S3
S4
S5
LF1
LF2
LF3
54

VIDEO BROADCASTING SYSTEM WITH CHANGEOVER DEVICE FOR SWITCHING BETWEEN MULTIPLE AUGMENTED PRODUCTION IMAGE SEQUENCES OF A CAPTURED REAL EVENT

TECHNICAL FIELD

The invention relates to a video broadcasting system comprising a server-side video distribution device, in particular, an OTT platform, which is configured to receive multiple production image sequences of a captured real event and augmented with virtual content from a production image device and to process the same; at least one user-side video output device, in particular, a playback device for streaming, which is connectable or connected to the video distribution device and which is configured to receive at least one of the multiple production image sequences and to output one of the received production image sequences or the received production image sequence, in particular, to show the same on a display.

BACKGROUND

It is known from the prior art, for example, from DE 10 2016 119 637 A1 originating from the applicant, to generate a change in at least one subsection of the production image in a television broadcasting system by means of augmentation, so that an augmented production image is generated and the augmented production image can be output.

The term "augment" or "augmentation" used herein is meant to designate a kind of enhancement of or change in the reproduction of reality, for example, the superimposition of an advertising message written in the English language in reality on a board of a playing field with an identical or another advert in another language, such as the language of the target country in which the television broadcast can be seen. Furthermore, a superimposition with a completely different message or information can also be done. However, a superimposition is not the only possibility of changing or augmenting a production image. Rather, within the scope of the present invention, augmentation can also be understood to mean that the production image itself is changed locally. The technical term "augmentation" used herein is oriented on the English term "augment" which means improve, enhance, enrich.

In the system known from DE 10 2016 119 637 A1, image sequences (video feeds) that are produced live or captured at sporting events, for example, are used as input. From this, the system produces a certain number of augmented production image sequences (so-called localized feeds) as output. These localized feeds are similar to the world feed, i.e., the feed that is normally sent to television viewers at home. The difference between the two types of feeds is that in a localized feed, existing adverts (e.g., on boards) are replaced by virtual adverts or new virtual adverts are introduced where no physical adverts have existed before (e.g., on the soccer pitch).

The known system is therefore designed to augment a production image sequence (localized feed) with virtual content. In other words, exactly one augmented production image sequence can be provided for a region or a country.

SUMMARY

The object underlying the invention is to specify a video broadcasting system that enables an enhanced and efficient use of augmented production image sequences.

Thus, a video broadcasting system is proposed, comprising a server-side video distribution device, in particular, an OTT platform, which is configured to receive multiple production image sequences of a captured real event and augmented with virtual content from a production image device and to process the same; at least one user-side video output device, in particular, a playback device for streaming, which is connectable or connected to the video distribution device and which is configured to receive at least one of the multiple production image sequences and to output one of the received production image sequences or the received production image sequence, in particular, to show the same on a display. In this process, it is envisaged that the video output device includes a changeover device which is configured such that, during the output of the one production image sequence, it automatically switches to another of the received production image sequences and outputs said other production image sequence.

This makes it possible to switch from one production image sequence to another production image sequence in a manner that is unnoticed for an end user and essentially without a time delay. The changeover or switch can, of course, also be made back to a previously output production image sequence.

The video broadcasting system can include a matching device that is configured to transmit switching data to the changeover device, and the changeover device can be configured to output a production image sequence assigned to the switching data.

The matching device can be configured to receive multiple receiver group data sets, wherein the number of receiver group data sets is identical to the number of the multiple production image sequences augmented with virtual content. In this way, a receiver group data set can be provided for each production image sequence augmented with virtual content, so that a technical or/and user-specific receiver group can be assigned to a particular production image sequence.

In this context, the matching device can be configured to generate the switching data as a function of the receiver group data sets.

In the video broadcasting system, the matching device can be configured to assign one of the receiver group data sets to a user of the video output device. In this way, technical or/and user-specific information about a user, such as the whereabouts, browser usage, terminal device used, surfing behavior on the Internet, age of the user, gender of the user, and the like, can be used as a technical data basis in order to assign a suitable receiver group data set to the particular user.

In this process, the matching device can be configured to determine the assignment of the particular receiver group data set to the particular user based on a comparison of user data with the receiver group data sets.

In this context, the matching device can be configured to assign that receiver group data set for which the following applies:

$$\text{loss}_{j,t} = \min_{a \in \mathcal{A}} \sum_{i \in I_{j,i}} D_t(P_a, P_i)$$

wherein:

a. Dt is the distance measurement for a time period t
b. Pi is the user data (profile) of user i
c. Pa is a receiver group data set from a content provider d. i is an individual user from all current users I
e. j is a single production image sequence
f. t is the time segment for a single virtual augmentation
g. a is a single augmentation of an augmentation collection A.

This way, by means of the specified minimization function, optimal augmentation a for a given user group $I_{j,t}$ that views the production image sequence j during a time segment t is selected.

Alternatively, the matching device can also be configured such that an optimal user group $I_{j,t}$ is determined for each time segment t of a production image sequence j with an already given augmentation a.

Also conceivable is a matching device that simultaneously determines an optimal augmentation a and an optimal user group $I_{j,t}$ from a given augmentation collection A and a total user group I.

In the video broadcasting system, the matching device can be part of the server-side video distribution device or part of the user-side video output device. In other words, the matching device can be provided centrally or decentrally, wherein, however, it is ensured in both cases that the centrally or decentrally determined or calculated switching data is transmitted to the changeover device of the particular video output device of a particular user.

In the video broadcasting system, the matching device can be configured to receive the receiver group data sets from the production image device.

In other words, the matching device, which can be implemented on the server side or on the user side, can, in combination with the changeover device, ensure that a certain production image sequence is received and displayed by the video output device.

In the video broadcasting system, each production image sequence can include multiple sections with virtually augmented image content, wherein the sections in each production image sequence start at the same time and end at the same time. This makes it possible to synchronize the switching times from one production image sequence to another production image sequence, so that, when switching between two production image sequences, an unnoticed switch can be made for the particular user.

In the video broadcasting system, the production image device can be configured to receive an image sequence from a captured real event and to generate the multiple production image sequences augmented with virtual content from this image sequence and to transmit them to the video distribution device. In this process, the production image device, for example, can be part of a television broadcasting system known from DE 10 2016 119 637 A1.

Accordingly, the video broadcasting system described above can also be combined with or connected to a television broadcasting system known from DE 10 2016 119 637 A1.

Therefore, a supplementary television broadcasting system is also proposed, comprising:

multiple television cameras, which are configured to capture camera images and output them as camera signals;

at least one production image device or production unit, which is configured to generate a sequence of production images from the camera images of the multiple television cameras and output them as production signals;

multiple analysis modules, wherein one analysis module is assigned to each television camera, wherein the analysis modules are configured to receive the camera images in a synchronously buffered manner, and wherein the analysis modules are configured to analyze each individual camera image and calculate camera image metadata, as well as an associated camera image hash value for each camera image and output the camera image metadata and the camera image hash value for each camera image in an asynchronous manner;

a synchronization module which is connected to the production image device or production unit and to the analysis modules and is configured to receive the production images from the production image device or production unit in a synchronously buffered manner and to calculate, for each production image, an associated production image hash value, as well as to receive, for each camera image, the camera image metadata and the associated camera image hash value from the analysis modules in an asynchronously buffered manner, wherein the synchronization module is further configured to compare production image hash values and camera image hash values, and, based on this comparison, to assign the associated camera image metadata of a camera image to a current production image as production image metadata, and to output the production image metadata in a synchronously buffered manner;

a multiplication module which is connected to the synchronization module and to the production image device or production unit and is configured to receive the production image metadata from the synchronization module in a synchronously buffered manner and to receive the production images from the production image device or production unit in a synchronously buffered manner, wherein the multiplication module is further configured to compensate for a time offset between a production image and the associated production image metadata, and wherein the multiplication module is further configured to generate, based on the production image metadata, a change in the production image of at least one subsection of the production image by means of augmentation, so that an augmented production image is generated, and to output the augmented production image.

Such a television broadcasting system comprising a video broadcasting system can be connected to a server-side video distribution device, in particular, an OTT platform, which is configured to receive multiple production image sequences of a captured real event and augmented with virtual content from the production image device or production unit and to process the same; at least one user-side video output device, in particular, a playback device for streaming, which is connectable or connected to the video distribution device and which is configured to receive at least one of the multiple production image sequences and to output one of the received production image sequences or the received production image sequence, in particular, to show the same on a display. In this process, it is envisaged that the video output device includes a changeover device which is configured such that, during the output of the one production image sequence, it automatically switches to another of the received production image sequences and outputs said other production image sequence.

BRIEF DESCRIPTION OF THE DRAWINGS

Further advantages and details of the invention emerge from the following description of embodiments with reference to the figures, in which.

DETAILED DESCRIPTION

Figure 1:
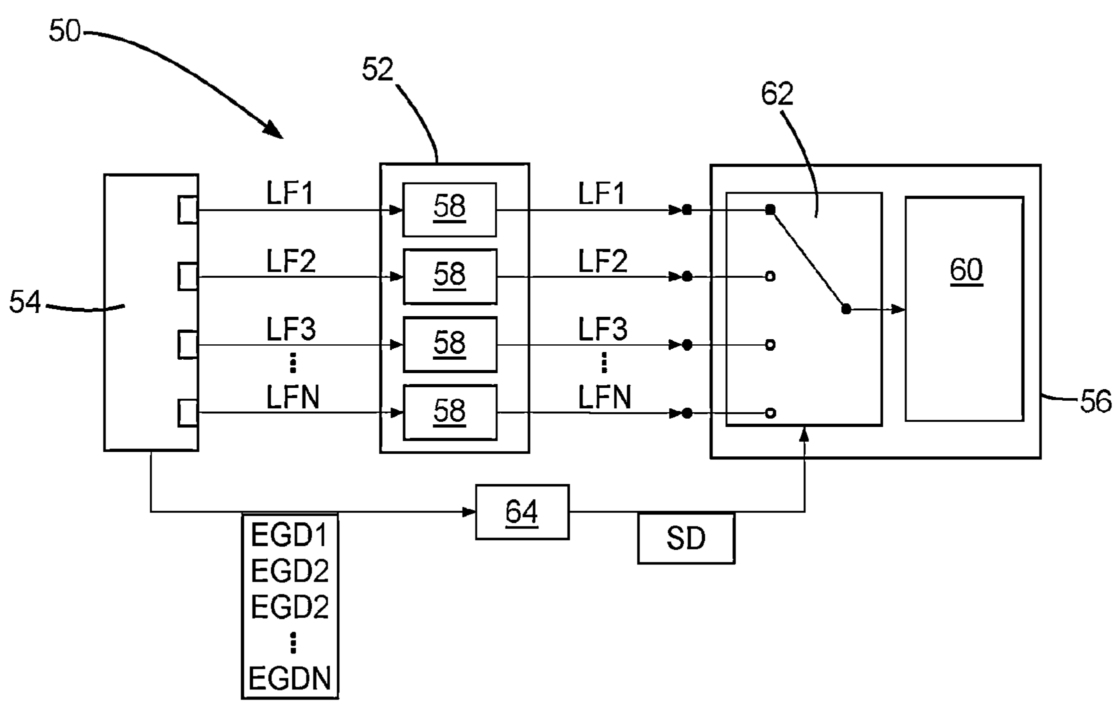
FIG. 1 shows a simplified and schematic diagram of an example of a video broadcasting device.

FIG. 1 shows a diagram of a video broadcasting device 50 in a schematic and simplified manner. The video broadcasting device 50 includes a video distribution device 52, which, in particular, is configured as a so-called OTT platform (over-the-top platform). The video distribution device is configured to receive multiple production image sequences LF1, LF2, LF3, LFN of a captured real event and augmented with virtual content from a production image device 54 and to process the same.

In particular, the production image device 54 is capable of augmenting each production image sequence LF1, LF2, LF3, LFN with different virtual content. In this way, each of the production image sequences LF1, LF2, LF3, LFN, for example, can be augmented with suitable virtual content for a specific group of end users.

The video broadcasting device 50 further comprises at least one user-side video output device 56, in particular, a playback device for streaming, which is connectable or connected to the video distribution device 52. The video output device 56, for example, can be a so-called standard streaming video player, e.g., based on technologies such as MPEG DASH (Dynamic Adaptive Streaming over HTTP) or HLS (http Live Streaming).

For the sake of clarity, only a single video output device 56 is depicted in FIG. 1. However, it goes without saying that the video distribution device 52 can be connected to multiple video output devices 56. This, in particular, is illustrated by content delivery network (CDN) components 58, which can be part of the video distribution device 52.

The video output device 56 is further configured to receive the multiple production image sequences LF1, LF2, LF3, LFN and to output one of the received production image sequences LF1, in particular, to show it on a display 60.

The video output device 56 includes a changeover device 62, which is configured such that, during the output of the one production image sequence LF1, it automatically switches to another of the received production image sequences LF2, LF3, LFN and outputs said other production image sequence.

The video broadcasting system 50 includes a matching device 64, which is configured to transmit switching data SD to the changeover device 62. In this process, the changeover device 62 is configured to output a production image sequence LF1, LF2, LF3, LFN assigned to the switching data SD.

The matching device 64 is configured to receive multiple receiver group data sets EGD1, EGD2, EGD3, EGDN, wherein the number of the receiver group data sets EGD1, EGD2, EGD3, EGDN is identical to the number of the multiple production image sequences LF1, LF2, LF3, LFN augmented with virtual content.

A respective receiver group data set EGD1, EGD2, EGD3, EGDN contains information relating to the virtual content with which the respectively assigned production image sequence LF1, LF2, LF3, LFN is augmented. Furthermore, a respective receiver group data set EGD1, EGD2, EGD3, EGDN contains information about a user target group to which corresponding virtual content is to be presented.

In the video broadcasting system 50, the matching device 64 is configured to generate the switching data SD as a function of the receiver group data sets EGD1, EGD2, EGD3, EGDN.

Furthermore, the matching device 64 is configured to assign one of the receiver group data sets to a user of the video output device 56. The assignment of the particular receiver group data set EGD1, EGD2, EGD3, EGDN to the particular user can be determined based on a comparison of user data with the receiver group data sets EGD1, EGD2, EGD3, EGDN.

The video broadcasting system 50 described above with reference to FIG. 1 and its functionality will be described in more detail below with reference to FIG. 2.

Figure 2:
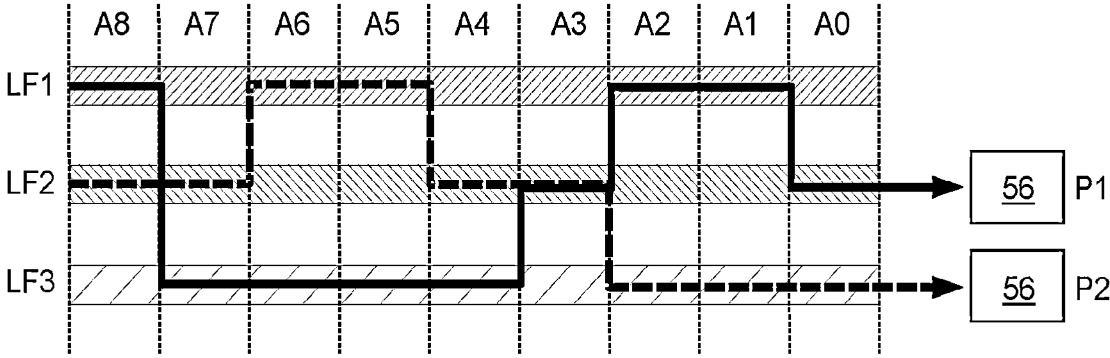
FIG. 2 shows a simplified and schematic diagram of the functionality of the video broadcasting device.

FIG. 2 illustrates three production image sequences LF1, LF2, LF3. The production image sequences LF1, LF2, LF3 include multiple sections A0 to A8 with virtually augmented image content, wherein sections A0 to A8 in each production image sequence LF1, LF2, LF3 start at the same time and end at the same time, which is illustrated by the vertical dashed lines.

Furthermore, FIG. 2 depicts two video output devices 56 in a simplified manner, which can be understood as representative of a respective user P1, P2.

As can be seen from FIG. 2, the above-described architecture of the video broadcasting device 50 can be used to chronologically divide each production image sequence LF1, LF2, LF3 into sections A0 to A8 or periods in which each viewer or user P1, P2 can see augmentation with virtual content that is composed of sections A0 to A8 from different production image sequences LF1, LF2, LF3.

In the example in FIG. 2, user P1 sees the production image sequence LF2 in section A0, then the production image sequence LF1 in sections A1 and A2, the production image sequence LF2 (again) in section A3, the production image sequence LF3 in sections A4 to A7, and the production image sequence LF1 in section A8. The sequences of sections A0 to A8 from the production image sequences LF1, LF2, LF3 are illustrated for user P1 as a solid black arrow.

In the example in FIG. 2, user P2 sees the production image sequence LF3 in sections A0 to A2, then the production image sequence LF2 in sections A3 and A4, the production image sequence LF1 in sections A5 and A6, and the production image sequence LF2 in sections A7 and A8. The sequences of sections A0 to A8 from the production image sequences LF1, LF2, LF3 are illustrated for user P2 as a dashed black arrow.

By means of the above-described system architecture of the video broadcasting device 50, a provision of production image sequences LF1, LF, LF3 can be used to present that production image sequence LF1, LF2, LF3 that best matches their profile, in particular, their user data, to a user P1, P2 during each section A0 to A8. In other words, each user P1, P2 sees a personalized sequence (feed) composed of the most suitable sections from the production image sequences LF1, LF2, LF3, wherein the suitable sections A0 to A8 are selected from the various production image sequences LF1, LF2, LF3, in particular, based on the above-mentioned switching data SD, which, in turn, bear relation to the user data and the receiver group data sets EGD.

The video broadcasting system 50 presented herein can therefore be used to address a specific selection or part of the user target group in each section A0 to A8, which can also be referred to as a time interval or period, by means of virtual augmentation. This selection can change from section to section. As can be seen from FIG. 2, both users P1, P2 see the same production image sequence LF2 during section A3 and thus also the same virtual augmentation contained in this section A3 from the production image sequence LF2. In all other sections A0 to A2 and A4 to A8, users P1, P2 see different production image sequences.

User P1, for example, may use a first type of device as video output device 56. User P2, for example, may use a second type of device as video output device 56. Information about the type of device, for example, can be part of user data.

The production image sequence, for example, may contain virtual augmentation in sections A8, A2 and A1, respectively, that bear relation to the first type of device used by user P1. Accordingly, the receiver group data set EGD1 contains information so that sections A8, A2 and A1 target users with the first type of device. By comparing the receiver group data set EGD1 with the user data of user P1 as described above, the control data SD for user P1 can be determined such that sections A8, A2 and A1 from the production image sequence LF1 are shown to user P1.

Since user P2 uses the second type of device, sections A8, A2 and A1 from the production image sequence are not of interest to said user P2. However, the production image sequence LF1, for example, may contain virtual augmentation in sections A6 and A5, which bear relation to the second type of device used by user P2. Accordingly, the receiver group data set EGD2 contains information so that sections A6 and A5 target users with the second type of device. By comparing the receiver group data set EGD2 with the user data of user P2 as described above, the control data SD for user P2 can be determined such that sections A6 and A5 from the production image sequence LF1 are shown to user P2.

In sections A7, A4, A3 and A0, for example, the production image sequence LF1 contains virtual augmentation that can target additional users who use other types of devices.

Figure 3:
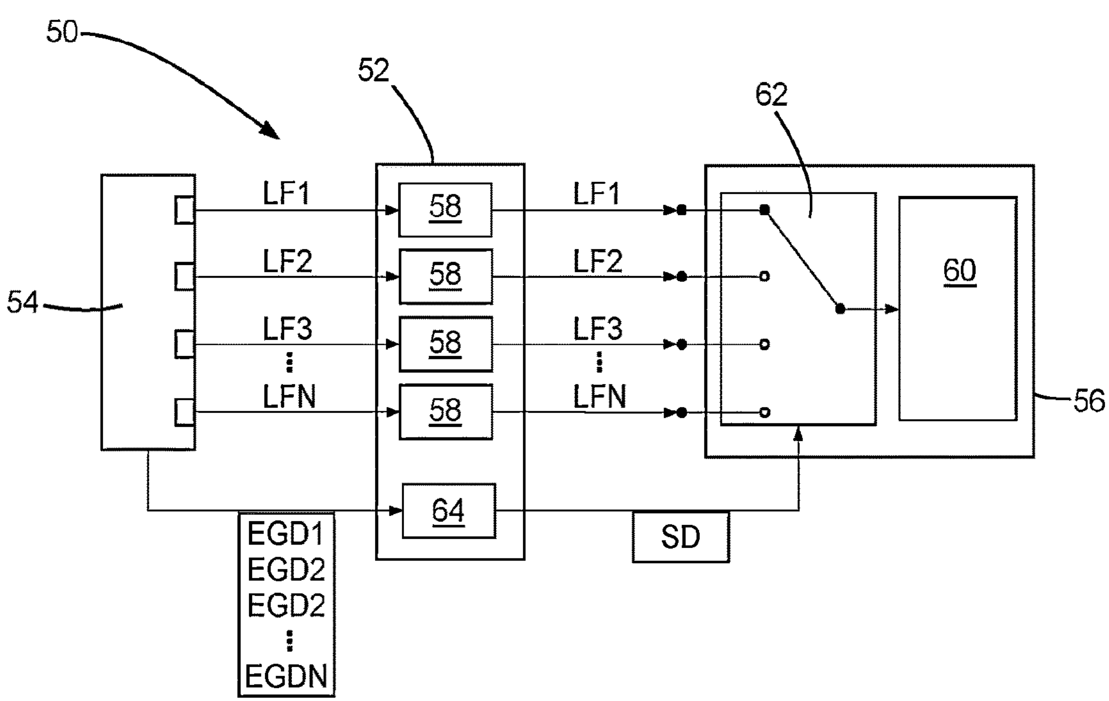
FIG. 3 shows a simplified and schematic diagram of another example of a video broadcasting device.

FIG. 3 shows an illustration similar to FIG. 1, wherein the matching device 64 is part of the server-side video distribution device 52. In other words, the video distribution device 52 is part of the infrastructure of an OTT platform. In such a technical implementation, the video distribution device 52 requires slightly more computing power to enable the execution of the matching device 64. A separate matching instance must be run for each user P1, P2, wherein the additional computing power required increases with the number of users P1, P2. However, the matching device 64 can be implemented such that a matching instance for one user only uses little computing power.

Figure 4:
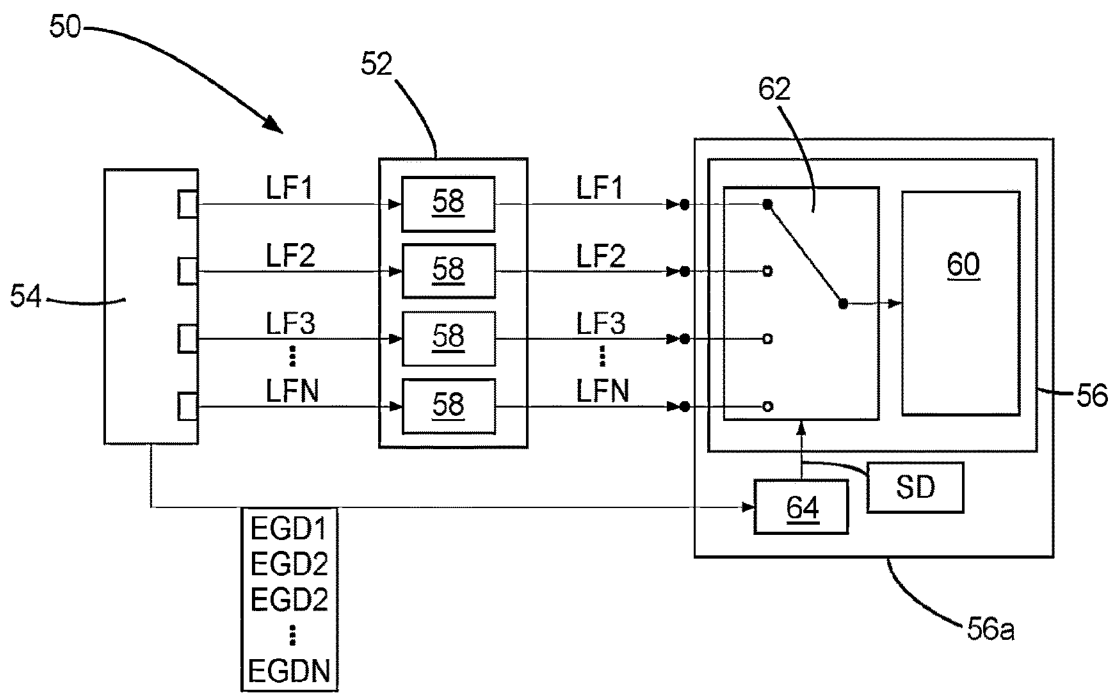
FIG. 4 shows a simplified and schematic diagram of a further example of a video broadcasting device.

FIG. 4 shows an illustration similar to FIG. 1 and FIG. 3, wherein the matching device 64 is part of the user-side video output device 56, 56*a*. For example, a standard streaming video player 56 (MPEG DASH, HLS based or another technology) may be extended by a matching device 64. This extended player 56*a* or this extended video output device 56*a* then runs on each terminal device of a respective user P1, P2.

Both the design according to FIG. 3 and that according to FIG. 4 are technically feasible and achievable. In an implementation according to FIG. 3, the video output device 56 (player) can remain standard-compliant, i.e., it does not contain any (proprietary) extension 56*a* with the matching device 64 proprietary technology [sic!]. This makes it possible for corresponding applications (video output device 56 or player) on the terminal device to remain unchanged for all users.

Figure 5:
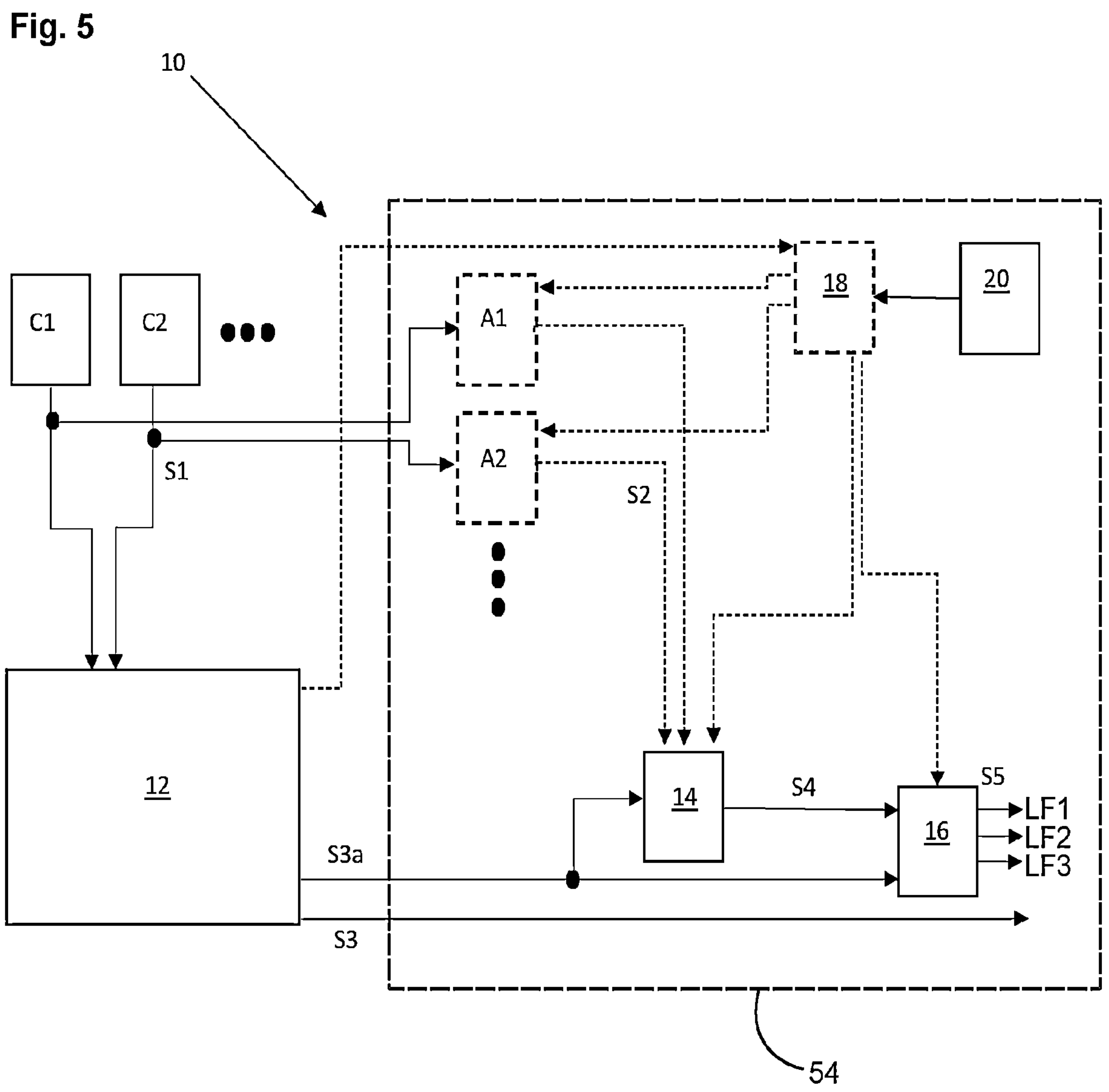
FIG. 5 shows a simplified and schematic diagram of a known television broadcasting system and its connection to a video broadcasting device of FIGS. 1 to 3.

FIG. 5 shows, by way of example, a television broadcasting system 10 known from the above-mentioned DE. The television broadcasting system 10 comprises multiple cameras C1, C2 and a production unit 12, wherein cameras C1, C2 transmit their camera images as camera image signals to the production unit 12. Normally, more than two cameras C1, C2 belong to such a television broadcasting system 10, which is indicated by the three black dots to the right of camera C2.

A customary processing path, which is sufficiently known, starts at cameras C1, C2. Camera signals S1 are captured by multiple cameras C1, C2 (to Cn) and transmitted to the production unit 12. Within the production unit 12, a production image sequence or a production image signal is compiled or edited from the camera images of the individual cameras C1 to Cn. The edited production image signal S3 or the consecutive production images, which is designated as world feed in the technical jargon, is being broadcast. In this context, it is pointed out that also in the case of post-production, such as in the case of repetition, slow motion, interviews or the like, the possibility is given to capture or superimpose augmentation, in particular, the same augmentation as in a previously live broadcast image. For this purpose, the production unit can be configured to also enable or disable augmentation by means of the control module for such post-productions during or after a live broadcast sequence.

The television broadcasting system 10 can be expanded as follows. Camera signals S1 are passed on to analysis modules A1, A2 (up to An, indicated by three black dots below A2). Analysis modules A1, A2 pass signals S2 on to a selection or synchronization module 14. One analysis module A1, A2 is assigned to each camera C1, C2. For each camera image, camera image metadata M1, M2 (up to Mn) are generated by analysis modules A1, A2 and an associated hash value H1, H2 (up to Hn) is calculated. A respective pair of the metadata and the hash value, i.e., for example, M1, H1 or M2, H2, are transmitted as signals S2 to the synchronization module 14 by analysis modules A1, A2. The synchronization module 14 further receives production image signal S3*a* or the production images from the production unit. The synchronization module 14 passes on revised metadata S4 of the camera currently visible in the production image to a multiplication module 16. The multiplication module 16 generates multiple augmented production image signals S5 which are being broadcast. Analysis modules A1, A2, the synchronization module 14 and the multiplication module 16 are controlled by a control module 18. The control module 18 is controlled via the production unit 12.

For the sake of completeness, an optional LED system 20 is indicated in the illustration of FIG. 5, which transfers image data, via an image transport protocol, e.g., HDMI or DVI, to the control module 18. However, this LED system is not mandatory for the basic functionality of the television broadcasting system 10.

In such a television broadcasting system 10, the video broadcasting system 50 described above with reference to FIGS. 1 to 4 can start or be connected where the multiplication module 16 generates multiple augmented production image signals S5. Accordingly, multiple production image signals S5 can be referred to as production image sequences LF1, LF2, LF3. In other words, the production image device 54 of FIGS. 1, 3 and 4 represents, in simplified form, the components of the television broadcasting system 10 described above and enclosed by the dashed rectangle.

The invention claimed is:

1. A video broadcasting system, comprising:

a server-side video distribution device configured to receive and process multiple production image sequences of a captured real event and augmented with virtual content from a production image device; and at least one user-side video output device connectable or connected to the video distribution device and configured to receive at least one of the multiple production image sequences and to output one of the received production image sequences or the received production image sequence, wherein the at least one user-side video output device includes a changeover device configured such that, during the output of the one production image sequence, the changeover device automatically switches to another of the received production image sequences and outputs the other production image sequence.

2. The video broadcasting system of claim 1, further comprising:

a matching device configured to transmit switching data to the changeover device, wherein the changeover device is configured to output one production image sequence assigned to the switching data.

3. The video broadcasting system of claim 2, wherein the matching device is configured to receive multiple receiver group data sets, and wherein the number of the receiver group data sets is identical to the number of the multiple production image sequences augmented with virtual content.

4. The video broadcasting system of claim 3, wherein the matching device is configured to generate the switching data as a function of the receiver group data sets.

5. The video broadcasting system of claim 3, wherein the matching device is configured to assign one of the receiver group data sets to a user of the video output device.

6. The video broadcasting system of claim 5, wherein the matching device is configured to determine an assignment of a particular receiver group data set to a particular user based on a comparison of user data with the receiver group data sets.

7. The video broadcasting system of claim 6, wherein the matching device is configured to assign the receiver group data set for which the following applies:

$$\text{loss}_{j,t} = \min_{a \in \mathcal{A}} \sum_{i \in \mathcal{I}_{j,i}} D_t(P_a, P_i)$$

where:

Dt is a distance measurement for a time period t,

Pi is a user data profile of user i,

Pa is a receiver group data set from a content provider, i is an individual user from all current users I, j is a single production image sequence, t is a time segment for a single virtual augmentation, and a is a single augmentation of an augmentation collection A.

8. The video broadcasting system of claim 3, wherein the matching device is configured to receive the receiver group data sets from the production image device.

9. The video broadcasting system of claim 2, wherein the matching device is part of the server-side video distribution device or part of the at least one user-side video output device.

10. The video broadcasting system of claim 1, wherein each production image sequence includes multiple sections with virtually augmented image content, and wherein the sections in each production image sequence start at a same time and end at a same time.

11. The video broadcasting system of claim 1, wherein the production image device is configured to receive an image sequence from a captured real event and to generate the multiple production image sequences augmented with virtual content from the image sequence and to transmit the multiple production image sequences to the video distribution device.

* * * * *